Dec. 1, 1925.

I. V. BLEVINS 1,564,121

AUTOMATIC SHUTTER

Filed July 23, 1924

I. V. Blevins INVENTOR

BY Victor J. Evans ATTORNEY

Dec. 1, 1925.

I. V. BLEVINS

AUTOMATIC SHUTTER

Filed July 23, 1924

I. V. Blevins
INVENTOR

BY Victor J. Evans
ATTORNEY

Patented Dec. 1, 1925.

1,564,121

UNITED STATES PATENT OFFICE.

IRA V. BLEVINS, OF TRAMMEL, VIRGINIA, ASSIGNOR OF ONE-HALF TO JOHN W. WHITLOW, OF TRAMMEL, VIRGINIA.

AUTOMATIC SHUTTER.

Application filed July 23, 1924. Serial No. 727,791.

*To all whom it may concern:*

Be it known that I, IRA V. BLEVINS, a citizen of the United States, residing at Trammel, in the county of Dickenson and State of Virginia, have invented new and useful Improvements in Automatic Shutters, of which the following is a specification.

This invention relates to moving picture projecting machines, and contemplates an automatically controlled fire shutter therefore, the shutter being instantly closed in event the film becomes broken in the machine at any place adjacent the lamp housing or within the danger zone, thereby shutting off the light to the stationary part of the film.

The nature and advantages of the invention will be better understood when the following detailed description, is read in connection with the accompanying drawings, the invention residing in the construction, combination and arrangement of parts as claimed.

In the drawings forming part of this application, like numerals of reference indicate similar parts in the several views, and wherein.

Figure 1:
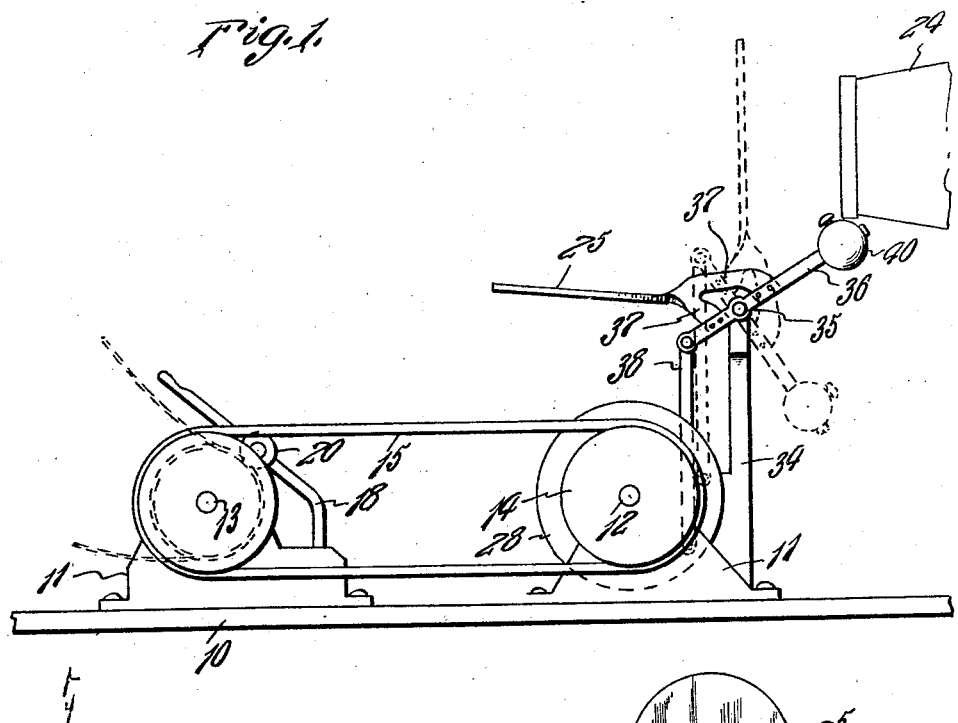
Figure 1 is a side elevation of the machine showing the open position of the shutter by full lines, and its closed position by dotted lines.
Figure 2:
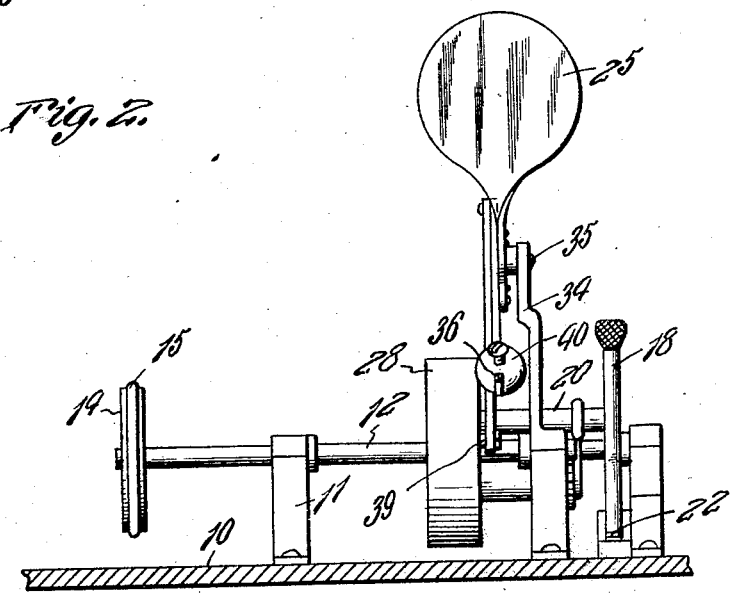
Figure 2 is a view taken at a right angle to Figure 1.
Figure 3:
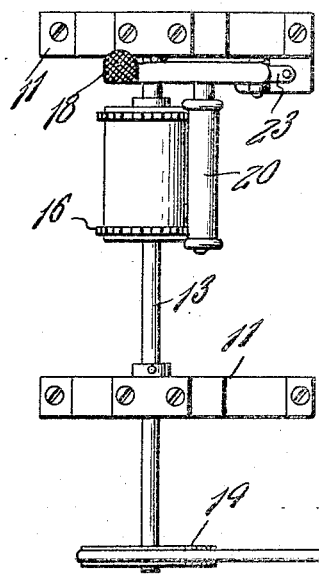
Figure 3 is a top plan view of Figure 1.
Figure 3:
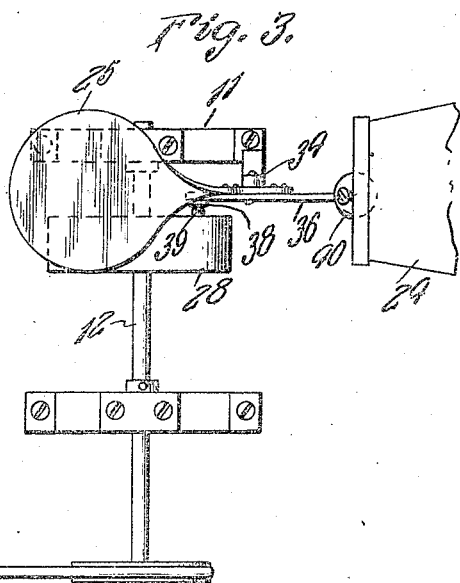
Figure 5:
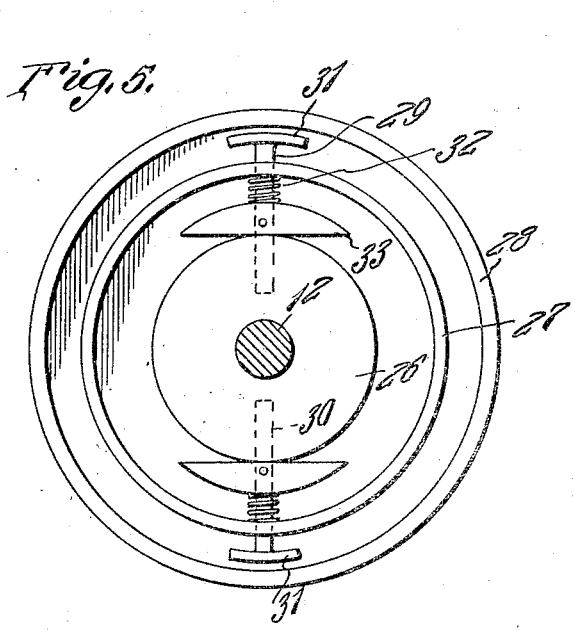
Figure 5 is a sectional view through the friction gear.
Figure 4:
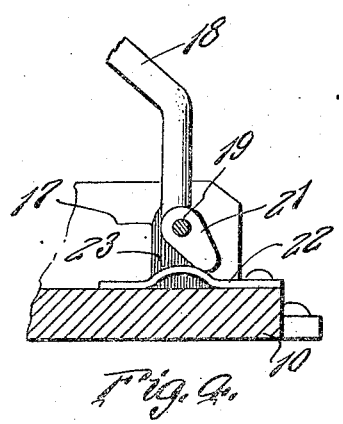
Figure 4 is a fragmentary view partly in section of the film holding means.

Referring to the drawings in detail, 10 represents the base of the machine, and rising from this base are spaced pairs of bearings 11, there being one pair of these bearings for each of the spaced parallel shafts 12 and 13 respectively. These shafts project an appreciable distance beyond the bearings, each shaft supporting a pulley 14, while trained over these pulleys is an endless belt 15 through the instrumentality of which the shafts are simultaneously rotated. Carried by the shaft 13 is the film sprocket 16, which is turned by the film while the machine is in motion, the film being drawn downwardly by a reel magazine mechanism not herein shown. Rising from the base 10 adjacent this film reel are spaced apertured lugs 17 between which the adjacent end of a lever 18 is pivoted as at 19. This lever is of angular shape so that the major portion of the lever will overlie the film reel 16 as shown in Figure 1, and carried by this lever and projecting at a right angle therefrom is a roller 20 which is used to hold the film against the reel as will be readily understood. The lever 18 is formed at its lower end with a cam shape extremity 21 which cooperates with a flat spring 22 secured to the base 10 and holding the lever in either an operative or inoperative position. For this purpose, the spring 22 is formed with a central bulged portion 23 across which the cam shaped portion 21 of the lever wipes, and the spring therefore operates to hold the lever in any given position. The lamp housing of the machine is indicated at 24, and arranged directly in advance of this lamp housing is the shutter 25.

The mechanism for automatically controlling the movements of the shutter 25 includes what I term a friction gear, the latter being carried by the shaft 12 as clearly shown in the various views of the drawing. This gear includes a disk 26 fixed on the shaft 12 which disk is formed with spaced concentrically disposed annular flange 27, which is surrounded by the friction gear proper indicated at 28. This gear 28 is loosely mounted upon the shaft 12, and does not rotate therewith while the machine is in operation. The friction gear 28 is only maintained to rotate a predetermined distance with the shaft 12 when the machine is initially put into operation, and for this purpose I make use of a pair of diametrically opposed rods 29 which are mounted for sliding movement through the flange 27 and into and out of the openings 30 formed in the disk 26. The outer end of each rod 29 carries a shoe 31 which operates in the space between the flange 27 and the friction gear 28, and these shoes are normally held spaced from said gear by means of springs 32 which surround said rods, being interposed between the flange 27 and stop elements 33 carried by the rods. The shoes 31 are actuated by centrifugal force, so that when the machine is operated, the shoes are moved outwardly into contacting engagement with the inner periphery of the friction gear 28, thereby rotating the latter a predetermined distance for a purpose to be presently set forth. When the machine ceases to operate incident to the breaking of the film the springs 32 function to retract the shoes 31, thereby releasing the friction gear 28 so that it may be returned to normal position incident to the automatic closing of the shutter.

Rising from the base 10 at a point adjacent the shaft 12 is a bracket 34, and fulcrumed on this bracket is a trunnion 35 carried by a lever 36 at a point between the ends thereof. The shutter 25 is formed with fingers 37 which are attached to the lever 36 at opposite sides of the fulcrum therefore, and the opening and closing of the shutter depends upon the movement of the lever 36. One end of this lever 36 is connected with the adjacent end of a link 38, the other end of said link being connected to a pin 39 carried by the gear 28. Slidably mounted upon the lever is a counterbalancing weight 40 used to move the lever in one direction when the machine ceases to operate and therefore closing the shutter.

In practice, as long as the machine continues to operate the shutter 25 will remain in an open position, as shown by full lines in Figure 1, it being understood that the gear 28 having been turned a predetermined distance in the manner above described, thereby lowering the link 38, and shifting the lever 36 to the position shown by full lines in Figure 1. The parts will remain in this position as long as the machine operates, but just as soon as the film breaks, the shoes 31 are retracted as above described, thereby releasing the friction gear 38 to allow this gear to rotate the lever to its normal position. The friction gear is rotated in this direction incident to the fall of the counterbalancing weight 40, which of course rocks the lever 36 upon its shaft to the position shown by dotted lines in Figure 1, which operation automatically closes the shutter 25. Manifestly, the mechanism is simple in construction and positive in operation, so that the shutter is closed almost instantly with the breaking of the film to prevent the light rays from the lamp housing coming in contact with that part of the film that of course remains stationary after the break occurs.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In an automatically controlled fire shutter for moving picture projecting machines, a friction actuated gear adapted to be partially rotated a predetermined distance from a normal position when the machine is operated, a standard, a lever pivoted upon the upper end of said standard at a point in its length, a shutter supported by said lever, a link connecting one end of the lever with said friction gear, whereby said lever is rocked upon its fulcrum to move the shutter from a vertical to a horizontal position while the machine is in operation, and a weight slidably adjusted on said lever at the opposite sides of said pivot to automatically reverse the movement of said lever and move said shutter upwardly to a vertical position when said gear is released incident to the breaking of the film.

In testimony whereof I affix my signature.

IRA V. BLEVINS.